United States Patent [19]

Itoh et al.

[11] Patent Number: 4,551,669
[45] Date of Patent: Nov. 5, 1985

[54] PACKAGED SOLAR CELL APPARATUS

[75] Inventors: Hiroyasu Itoh, Kariya; Yasutoshi Suzuki, Oobu; Yasuhiro Horiuchi; Kunihiko Hara, both of Aichi, all of Japan

[73] Assignee: Nippondenso Co., Ltd., Kariya, Japan

[21] Appl. No.: 537,717

[22] Filed: Sep. 30, 1983

[30] Foreign Application Priority Data

Oct. 1, 1982 [JP] Japan .................. 57-171030

[51] Int. Cl.$^4$ .................. G05F 1/46; H01L 27/14
[52] U.S. Cl. .................. 323/268; 323/906; 136/293
[58] Field of Search .................. 323/283, 267-272, 323/282, 284, 299, 349-351, 906; 136/291-293

[56] References Cited

U.S. PATENT DOCUMENTS

| | | | |
|---|---|---|---|
| 3,430,127 | 2/1969 | Weiss | 323/293 |
| 3,696,286 | 10/1972 | Ule | 323/222 |
| 3,896,368 | 7/1975 | Rym | 323/224 |
| 4,175,249 | 11/1979 | Gruber | 323/283 |
| 4,179,612 | 12/1979 | Smith | 126/425 |
| 4,314,546 | 2/1982 | Miller | 126/425 |
| 4,328,456 | 5/1982 | Suzuki et al. | 323/906 X |

Primary Examiner—Peter S. Wong
Attorney, Agent, or Firm—Cushman, Darby & Cushman

[57] ABSTRACT

A packaged solar cell apparatus comprises at least two sunlight electric generating devices, a light intensity detector for producing an output signal in response to the intensity of incident sunlight, a comparator for comparing an output signal level of the light intensity detector with a reference level, and a switch for automatically switching the connection of the plurality of sunlight electric generating devices in accordance with an output signal of the comparator. The connection of the plurality of sunlight electric generating devices is switched between series and parallel connections, respectively, as the output signal level of the light intensity detector becomes higher or lower than the reference level, whereby output electric power from the plurality of sunlight electric generating devices is efficiently supplied to a desired electric load in accordance with the intensity of insolation.

1 Claim, 4 Drawing Figures

PACKAGED SOLAR CELL APPARATUS

BACKGROUND OF THE INVENTION

1. FIELD OF THE INVENTION

The present invention relates to a packaged solar cell apparatus useful as a power supply for a vehicle such as an automobile or other mobile objects, more particularly, to an improvement of a packaged solar cell apparatus which converts sunlight energy into electrical energy and utilizes the electrical energy as a power supply for feeding an instrumentation system or a regulating system mounted on the vehicle, thereby lightening a burden on the vehicle-mounted battery as far as possible.

2. DESCRIPTION OF THE PRIOR ART

As a conventional apparatus in this field, an automobile ventilation system using a solar cell is known as disclosed by Japanese Patent Application Laid-Open No. 140,731/78. The disclosed ventilation system is intended to prevent an increase of the temperature in a passenger copartment of an automobile by ventilating the passenger compartment, while the automobile is parked, by driving a fan with electrical output energy generated by a solar cell mounted on the body of the automobile. The ventilation system has an advantage such that the electrical output energy, that is, an amount of generated electric power increases as the radiation intensity of sunlight increases, thereby causing an increase in a rotational speed of the fan and hence in a ventilation air flow, so that ventilation capacity can be controlled automatically in response to insolation intensity, without requiring any special control device to make the rotational speed of the fan adapted to a change of weather. However, because of the relation between a load current versus a voltage characteristic of the fan and an output current versus an output voltage characteristic of the solar cell, it is impossible to use the solar cell always in an optimum condition regardless of insolation intensity.

This relation will be explained with reference to FIG. 4. When insolation is intense, two sets of solar cells connected in series exhibit a V-I characteristic as shown by (B), and hence an output power thereof has an output characteristic as indicated by (B'). If a fan of a V-I characteristic shown by (A) is used as an example of a load on the solar cells, the operating point becomes the intersection a of the curves (A) and (B), and the maximum output point is shown by the point a'. However, when insolation intensity decreases, the serially connected solar cells exhibit output characteristics shown by the curves (C) and (C'), and the operating point becomes the intersection b of the curves (A) and (C) and the output power is shown by the point b' on the curve (C') which deviates from the maximum output point on the curve (C'). As described above, even if the solar cells have been adapted to operate at their optimum operating point when insolation intensity is high, the operating point thereof deviates from the optimum operating point when insolation intensity becomes low. Conversely, even if the solar cells have been adapted to operate at their optimum operating point when insolation intensity is low, the operating point thereof deviates from the optimum operating point when insolation intensity becomes high. Thus, it is difficult to make the fan operate always at an optimum operating point of the serially connected solar cells in either case.

SUMMARY OF THE INVENTION

Proceeding with the technical development in the above-mentioned respect, the present invention contemplates to further promote the utility of a solar cell apparatus by introducing improvements in the power supply system for feeding a control and/or operation system of a vehicle or other moving objects, the simplification of the overall structure of the apparatus, the packaging of the apparatus, etc. Namely, in view of the fact that, when mounting sunlight electric generation means such as solar cells on an automobile body, for example, to utilize it as a power supply, the maximum output power point of the solar cells changes with insolation conditions, resulting in a change of optimum operating conditions, the main object of the present invention is to provide an apparatus for automatically switching the connection of the solar cells between serial and parallel in response to a change of insolation intensity, or more particularly, to provide a packaged solar cell apparatus which is simple in construction and easy to manufacture and requires no external power supply and which has a self-deciding function for switching automatically between the series connection and the parallel connection of the solar cells in response to high and low insolation intensity, respectively.

DESCRIPTION OF THE PREFERRED EMBODIMENTS

Embodiments of the present invention will be described below with reference to the accomanying drawings.

Figure 1:
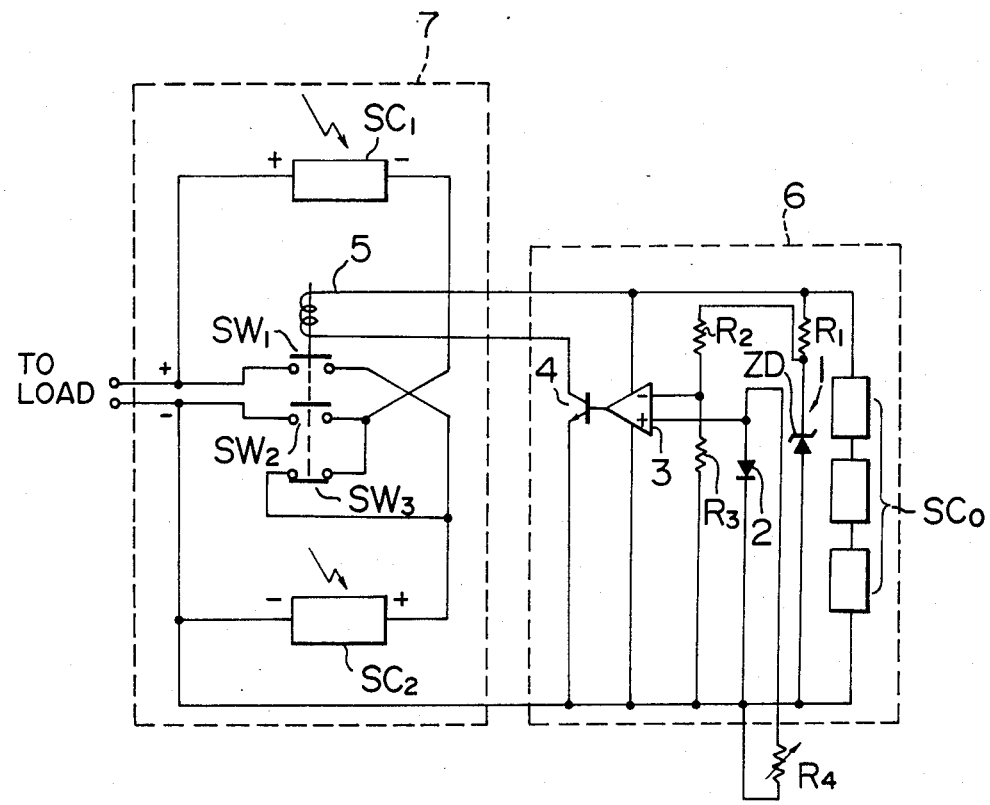
FIG. 1 shows an electrical circuit configuration of a packaged solar cell apparatus of an embodiment of the present invention.

FIG. 1 is an electrical circuit diagram showing a typical embodiment of a packaged solar cell apparatus according to the present invention. In FIG. 1, reference symbol $SC_0$ designates solar cells for converting light energy of sunlight efficiently into electrical energy, numeral 1 a voltage regulation circuit including a zener diode ZD and a resistor $R_1$ for maintaining an electrical output of the solar cells $SC_0$ at a constant voltage level, numeral 2 a light intensity detector such as a phototransistor or a photodiode for detecting the intensity of sunlight and generating an electrical output signal indicative of the detected sunlight intensity, numeral 3 a comparator circuit constituted mainly by an operational amplifier and comparing the electrical output signal of the light intensity detector 2 applied to a non-inverted input thereof with a reference voltage applied to an inverted input thereof, and numeral 4 a transistor current amplifier circuit responsive to an output signal of the comparator circuit 3 for driving a load thereon (namely, a microrelay 5 described later). All these circuit elements and electrical circuits are incorporated in a monolithic semiconductor substrate of silicon or the like through a publicly known manufacturing process, thereby forming a semiconductor integrated circuit section 6 which functions as a light intensity deciding circuit. Reference symbols $SC_1$ and $SC_2$ designate first and second sunlight electric generating means, respectively, each thereof having a far greater area and a far higher output than the solar cells $SC_0$, which sunlight electric generating means may preferably be amorphous silicon solar cells. Numeral 5 designates a coil of a microrelay driven by an output of the current amplifier circuit 4. Reference symbols $SW_1$ and $SW_2$ designate break contacts of the microrelay 5, and $SW_3$ a make contact of the microrelay, all of which are operatively interlocked with one another.

Figure 2:
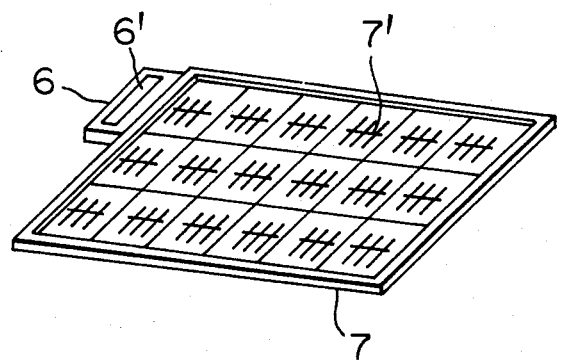
FIG. 2 schematically shows an external appearance of the packaged solar cell apparatus, particularly, an arrangement of a main power supply panel section for utilizing sunlight including sunlight electric generating means and a semiconductor integrated circuit section including solar cells, a light intensity detector, etc., and further an overall construction of the packaged apparatus comprising such sections.

In the apparatus of this invention, the sunlight electric generating means $SC_1$, $SC_2$ and the microrelay including the coil 5 and the contacts $SW_1$, $SW_2$ and $SW_3$ are incorporated in a main power supply panel section 7 as shown in FIG. 2. Further, the main power supply panel section 7 and the semiconductor integrated circuit section 6 are assembled into a packaged unit. Thus, the packaged solar cell apparatus comprising the electrical circuits shown in FIG. 1 has an appearance shown in FIG. 2, for example. In FIG. 2, a large area portion designated by numeral 7' shows a construction of the first and second sunlight electric generating means $SC_1$ and $SC_2$, respectively, which are arranged with their sunlight receiving sides directed upward. A small area portion 6' adjacent to the left of the large area portion 7' shows a sunlight receiving surface of the semiconductor integrated circuit section 6. The semiconductor integrated circuit section 6 is incorporated with the main power supply panel section 7 to form a packaged unit with a sunlight receiving side of the solar cells $SC_0$ therein being positioned to face the small area portion 6'. The microrelay included in the packaged unit is not shown in FIG. 2.

As will be seen from the above-described construction of the embodiment, not only electric driving power for the coil 5 of the mocrorelay but also electric power necessary for the operation of the semiconductor integrated circuit section 6 itself is supplied from the solar cells $SC_0$ in the semiconductor integrated circuit section 6. Thus, the packaged solar cell apparatus of the present invention has a built-in solar cell power supply and therefore does not need any external power supply. Further, the apparatus also has a self-deciding function provided by having the light intensity detector 2, the comparator circuit 3, etc. incorporated in the semiconductor integrated circuit section 6, which function is required for an appropriate and efficient operation of the apparatus.

The operation of this embodiment will be described hereunder in more detail. There are respectively applied to a pair of input terminals of the operational amplifier of the comparator circuit 3 a voltage generated by the light intensity detector 2 for producing a signal responsive to the sunlight intensity and a reference voltage obtained by dividing in the ratio of the resistance $R_2$ to the resistance $R_3$ a constant voltage obtained by stabilizing an output voltage of the solar cells $SC_0$ through the voltage regulation circuit 1. The input voltages are compared with each other in the magnitude through the comparator circuit 3, and the comparator circuit 3 produces an output signal representing a decision resulted from the comparison, which output signal is applied to the current amplifier circuit 4.

Figure 4:
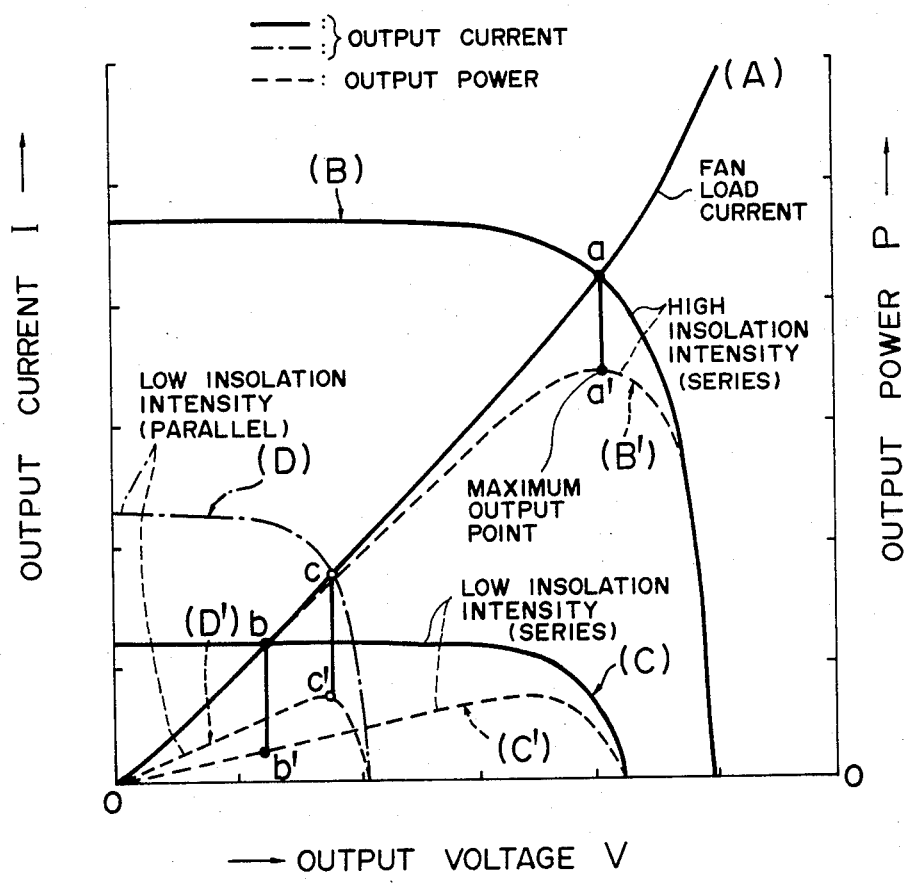
FIG. 4 is an electrical characteristic diagram showing the relation of the output current and output power versus the output voltage of solar cells in respect of the combinations of high or low insolation intensity with the series of parallel connection of two sets of solar cells.

The output of the comparator circuit 3 rises to a high level, thereby rendering the current amplifier circuit 4 conductive, when the insolation intensity is high. As a result, the break contacts $SW_1$ and $SW_2$ among the three contacts of the coil 5 of the mocrorelay are opened and the make contact $SW_3$ is closed (FIG. 1 shows this state), whereby the first and second sunlight electric generating means $SC_1$ and $SC_2$ are connected in series with each other. In this state, the combination of the sunlight electric generating means $SC_1$ and $SC_2$ exhibits output characteristics shown at (B) and (B') in FIG. 4, and the output current is shown by the intersection a of the curves (A) and (B) and the output power is shown by the maximum point a'.

While, when the insolation intensity is low, the output of the comparator circuit 3 falls to a low level, thereby rendering the current amplifier circuit 4 nonconductive. As a result, the contacts $SW_1$ and $SW_2$ of the coil 5 of the microrelay are closed and the contact $SW_3$ is opened. Consequently, the sunlight electric generating means $SC_1$ and $SC_2$ are connected in parallel with each other. In this state, the parallel connection of the sunlight electric generating means $SC_1$ and $SC_2$ exhibits output characteristics shown at (D) and (D') in FIG. 4, and the output current is shown by the intersection c of the curves (A) and (D) and the output power is shown by the maximum output point C' on the curve (D'). The output power at the point c' on the curve (D') is much greater than the output power at the point b' on the curve (C') which shows the output power characteristic of the series connection of the sunlight electric generating means $SC_1$ and $SC_2$ when the insolation intensity is low. As explained above, the sunlight electric generating means are connected in series or in parallel according to whether the insolation intensity is high or low, thereby making it possible to use the output of the sunlight electric generating means effectively for the purpose of ventilation by the use of the fan lead.

Figure 3:
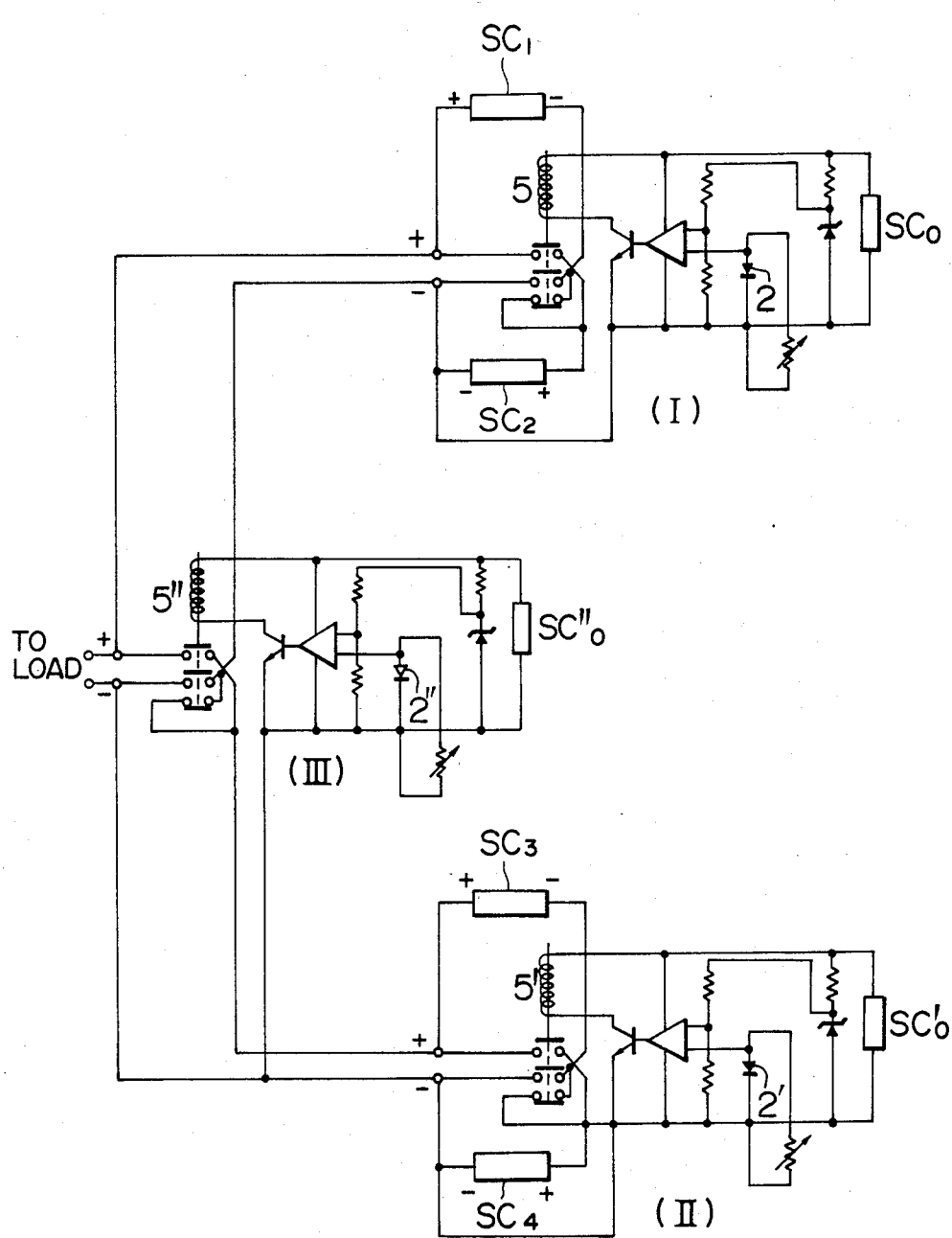
FIG. 3 shows an electrical circuit configuration of another embodiment of the present invention.

Now, an electrical circuit configuration of a packaged solar cell apparatus of another embodiment of the development of the technical concept of the present invention will be explained with reference to FIG. 3, in which solar cells making up the sunlight electric generating means, which are built in the packaged solar cell apparatus mounted on an automobile, are divided into a number of groups, whereby the packaged solar cell apparatus is designed to assure always optimum electric power supply to a load thereon even when the output of the solar cells varies considerably with a change with time of insolation intensity under various environmental conditions under which the automobile is placed. In FIG. 3, the solar cells making up the sunlight electric generating means in the main power supply panel of the packaged solar cell apparatus are divided into four sets of solar cells $SC_1$, $SC_2$, $SC_3$ and $SC_4$. The solar cells, $SC_1$ and $SC_2$ are combined to form a first pair, and $SC_3$ and $SC_4$ a second pair. Each pair of solar cells is combined with necessary circuit elements thereby to compose each of electric circuits (I) and (II) which are substantially equivalent to the electric circuit of the embodiment shown in FIG. 1. A detailed description of the concrete structure, operation, etc. of the electric circuits (I) and (II) will be omitted here. However, as will be understood from FIG. 3, since the electric circuits (I) and (II) comprise the light intensity detectors 2 and 2' in addition to the solar cells $SC_0$ and $SC_0'$ built therein which serve as power supplies for generating electric power for driving the electric circuits, respectively, each of the electric circuits (I) and (II) has a self-deciding function. On the other hand, the structure of the electric circuit (III) is substantially the same as that of the electric circuits (I) and (II) except that the electric circuit (III) lacks the main power supply panel and hence solar cells making up the sunlight electric generating means. The electric circuit (III) has a solar cell $SC_0''$ built therein, which supplies driving electric power, and besides has the light intensity detector 2'', etc. for providing a self-deciding function incorporated in the semiconductor integrated circuit section together with the solar cell $SC_0''$. In the embodiment shown in FIG. 3, the solar cells constituting the sunlight electric generating means of the main power supply panel are divided into four sets which in turn are grouped into two pairs, and each of the three electric circuits (I), (II) and (III) is provided with a self decision-making function, whereby any one of the following four connection modes is available according to the amount of insolation:

(i) All the four solar cells are connected in series with each other;
(ii) All the four solar cells are connected in parallel with each other;
(iii) The series connection of the solar cells $SC_1$ and $SC_2$ are connected in parallel with the series connection of the solar cells $SC_3$ and $SC_4$; and
(iv) The parallel connection of the solar cells $SC_1$ and $SC_2$ are connected in series with the parallel connection of the solar cells $SC_3$ and $SC_4$.

Therefore, according to this embodiment, it is possible for the package itself to decide properly as to how a selection should be made of a most suitable mode of connection with a load thereon from the four connection modes in accordance with the amount of insolation.

It will be understood from the foregoing description that the packaged solar cell apparatus according to the present invention has remarkable advantages as described below.

(1) An efficient electric power output is available commensurately with the degree of the insolation intensity by switching the connection mode of a plurality of sunlight electric generating means between series and parallel connections in accordance with the intensity of sunshine.

(2) The above-mentioned switching operation is performed automatically according to the self-deciding function of the packaged solar cell apparatus, so that any manual operation becomes unnecessary and the switching can be performed at optimum timing.

(3) Since a second sunlight electric generating means built in the packaged solar cell apparatus operates as a power supply to the circuit section for effecting the switching control of the sunlight electric generating means of the main power supply, there is no necessity to use an external power supply, so that it becomes possible to select freely a place for mounting the packaged solar cell apparatus and accordingly to find a broad application field, thus rendering the apparatus of this invention highly advantageous in practical use.

We claim:

1. A packaged solar cell apparatus comprising: a plurality of package units each one of said package units including:
   (a) at least two sunlight electric generating means for converting sunlight into electrical energy;
   (b) light intensity detector means including a photoelectric element for supplying an output voltage indicative of the intensity of sunlight to a load resistor connected to said photoelectric element and for producing an output signal formed by a voltage appearing across said load resistor;
   (c) comparator means for comparing the output signal of said light intensity detector means with a reference voltage level to produce an output signal indicative of a result of the comparison;
   (d) switching means for automatically switching the connection of said at least two sunlight electric generating means in accordance with the output signal of said comparator means; and
   (e) third sunlight electric generating means, separate from said at least two sunlight electric generating means, for actuating said switching means;
   each of said package units having a light intensity self-deciding function for connecting said at least two sunlight electric generating means in series with each other when the output signal of said light intensity detector means has a level higher than the reference voltage level and for connecting said at least two sunlight electric generating means in parallel with each other when the output signal of said light intensity detector means has a level lower than the reference voltage level, thereby driving a desired electric load with maximum output electrical energy from said at least two sunlight electric generating means in response to the sunlight intensity detected by said light intensity detector means;
   said packaged solar cell apparatus including a plurality of packaged units being constructed so that at least two packaged units therein are incorporated with a separate set of said switching means, said third sunlight electric generating means, said light intensity detector means and said comparator means which switches said at least two packaged units, thereby forming a packaged unit of a greater scale, and repeated formation and interconnection of said packaged units of a greater scale resulting in a large scale cell apparatus whereby said resultant large scale solar cell apparatus drives the desired electric load with maximum output electrical energy therefrom in response to a distribution of the sunlight intensity detected by said respective light intensity detector means.

* * * * *